US 6,659,665 B1

(12) United States Patent
Huang et al.

(10) Patent No.: US 6,659,665 B1
(45) Date of Patent: Dec. 9, 2003

(54) USB KEYBOARD HAVING BLUE TOOTH DEVICE

(75) Inventors: Alan Huang, Hsin Chuang (TW); Vincent Cheng, Hsin Chuang (TW)

(73) Assignee: Global Sun Technology Inc., Taipei (TW)

( * ) Notice: Subject to any disclaimer, the term of this patent is extended or adjusted under 35 U.S.C. 154(b) by 0 days.

(21) Appl. No.: 10/394,864

(22) Filed: Mar. 20, 2003

(51) Int. Cl.[7] .................................................. B41J 5/08
(52) U.S. Cl. ........................ 400/472; 400/474; 400/477; 345/168
(58) Field of Search ................................. 400/472, 474, 400/477; 341/21, 22, 168; 361/679, 680; 345/168–172; 235/145 A, 145 R, 146; 200/5 A; 434/227–233

(56) References Cited

U.S. PATENT DOCUMENTS 6,587,053 B1 * 7/2003 Lee ........................ 340/825.72

2003/0006966 A1 * 1/2003 Lin et al. .................... 345/168

FOREIGN PATENT DOCUMENTS

JP 2001117676 A * 4/2001 .............. G06F/1/26
KR 2001015972 A * 3/2001 ........... G06F/17/00

* cited by examiner

Primary Examiner—Charles H. Nolan, Jr.
Assistant Examiner—Minh Chau

(57) ABSTRACT

A keyboard assembly includes an interface facility having a USB plug for coupling to computer facility and an interface switching device coupled to the USB plug. A keyboard facility includes an interface device coupled to the interface facility, an electric power supply device coupled to the interface device to receive electric power from the computer facility, and a keyboard matrix device to detect and send signals of the keyboard assembly to the computer facility. A blue tooth facility is coupled to the interface facility, and includes a signal transforming device and an antenna to receive and send signals.

8 Claims, 4 Drawing Sheets

USB KEYBOARD HAVING BLUE TOOTH DEVICE

BACKGROUND OF THE INVENTION

1. Field of the Invention

The present invention relates to a keyboard device, and more particularly to a keyboard assembly having a blue tooth device for wirelessly communicating with the other computer facilities or end users.

2. Description of the Prior Art

Various kinds of typical computer keyboards have been developed and widely used to couple to various kinds of computer facilities, for operating or controlling the computer facilities and/or the peripheral facilities that are coupled to the computer facilities. Normally, the typical computer keyboards are coupled to computer facilities with electric cables.

For communicating with various wireless network systems, additional antenna and/or the other wireless transforming or communicating devices are further required to be purchased and coupled to the computer facilities separately, for allowing the computer facilities to be communicated with the other end users or computer facilities or network systems wirelessly. The typical keyboards may not be used to wirelessly communicate with the other end users or computer facilities or network systems.

In addition, it is expensive and inconvenient for the users to purchase and couple or connect the antenna and/or the other wireless transforming or communicating devices to the computer facilities.

The present invention has arisen to mitigate and/or obviate the afore-described disadvantages of the conventional keyboards for computer facilities.

SUMMARY OF THE INVENTION

The primary objective of the present invention is to provide a keyboard assembly for wirelessly communicating the computer facilities to the other end users or computer facilities or network systems.

In accordance with one aspect of the invention, there is provided a keyboard assembly comprising an interface facility including a USB plug for coupling to computer facility, and including an interface switching device coupled to the USB plug, a keyboard facility including an interface device coupled to the interface switching device of the interface facility, an electric power supply device coupled to the interface device of the keyboard facility, to receive electric power from the computer facility, and a keyboard matrix device coupled to the electric power supply device, to detect and send signals of the keyboard assembly to the computer facility via the interface device of the keyboard facility and the interface facility, and a blue tooth facility including an interface device coupled to the interface switching device of the interface facility, a signal transforming device coupled to the interface device of the blue tooth facility, to transform signals to and from the computer facility, and an antenna coupled to the signal transforming device to receive and send signals from and out of the computer facility.

The blue tooth facility further includes an electric power supply device coupled to the interface device of the blue tooth facility, to receive electric power from the computer facility. The blue tooth facility further includes a blue tooth control device coupled to the signal transforming device of the blue tooth facility.

The keyboard facility further includes a keyboard control device coupled to the electric power supply device of the keyboard facility, to control sending of signals of the keyboard assembly to the computer facility.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
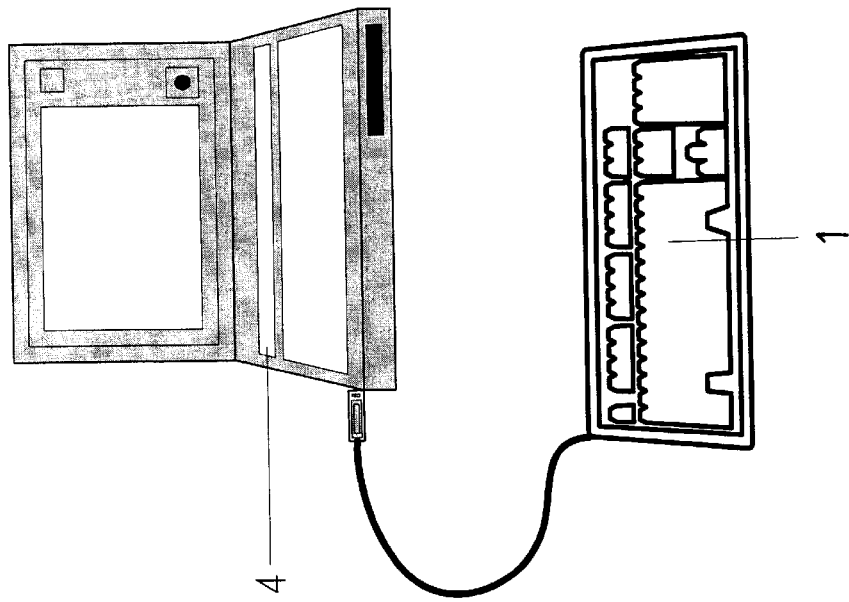
FIG. 1 is a perspective schematic view illustrating the computer facilities to be operated or communicated with a keyboard assembly in accordance with the present invention.
Figure 1:
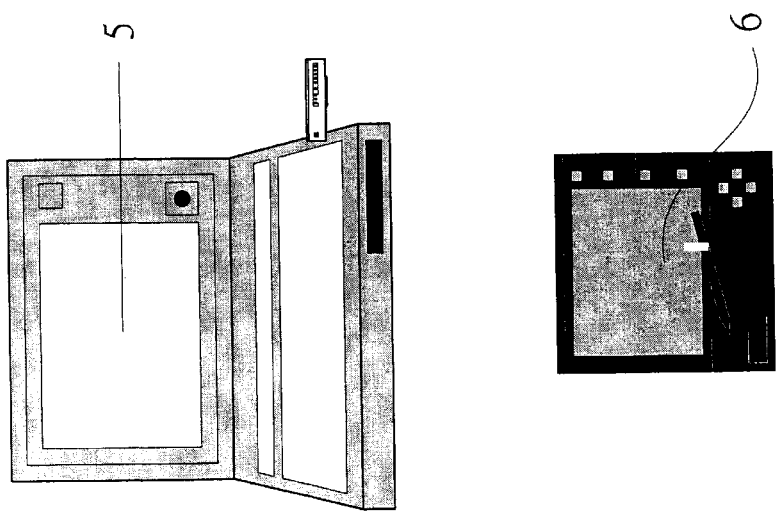

Referring to the drawings, and initially to FIG. 1, a keyboard in accordance with the present invention is a keyboard assembly 1 for coupling to various kinds of computer facilities 4, such as personal computers, notebook computers, personal digital assistants (PDA), etc., and for wirelessly communicating with the other end users 5 or PDAs 6.

Figure 2:
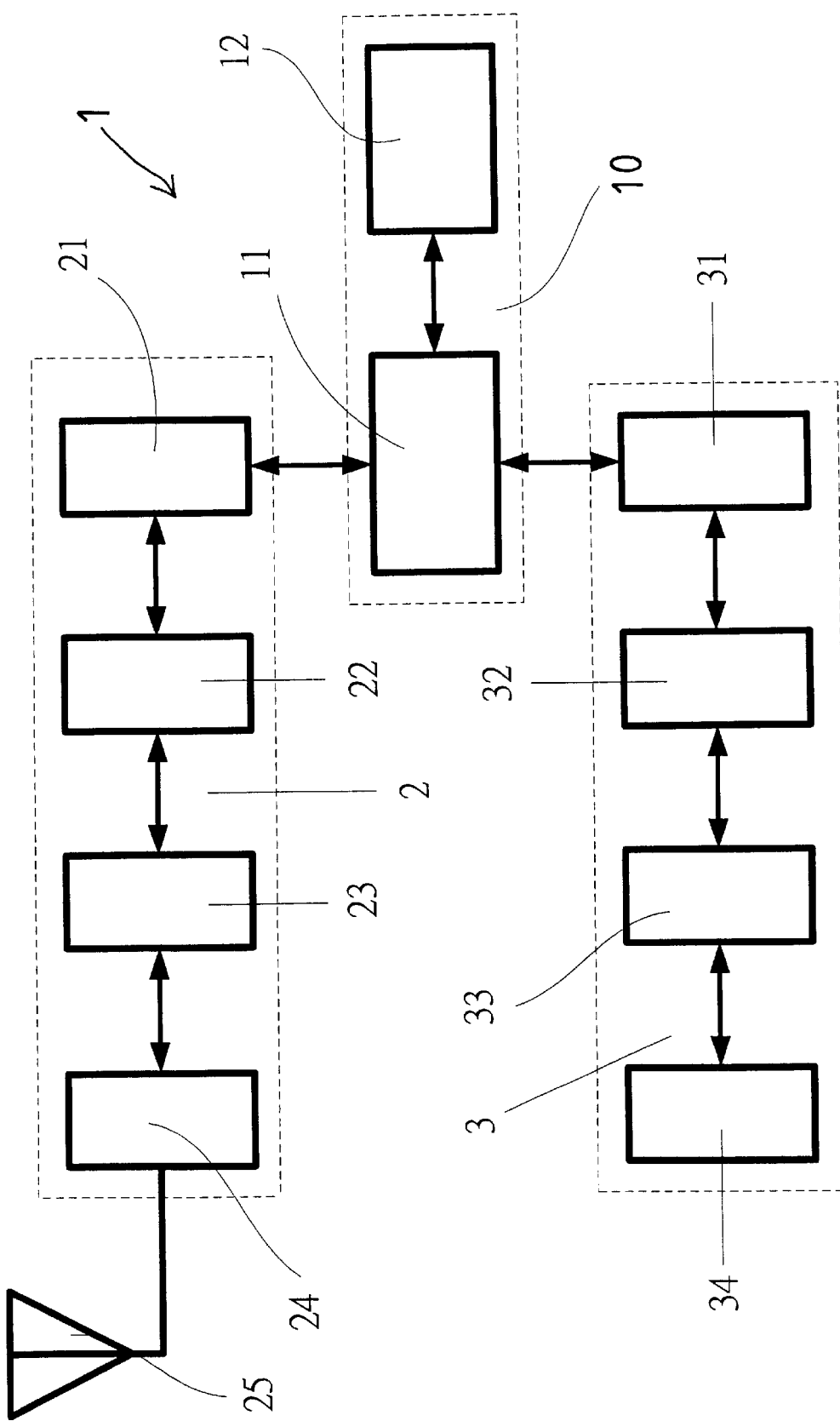
FIG. 2 is a block diagram illustrating the parts or members or elements of the keyboard assembly.

As shown in FIG. 2, the keyboard assembly 1 comprises an interface facility 10, and a blue tooth facility 2 and a keyboard facility 3 coupled to the interface facility 10. The interface facility 10 is provided for coupling to various kinds of computer facilities 4, and the blue tooth facility 2 is provided for wirelessly communicating purposes.

The interface facility 10 includes an interface switching device 11 coupled to and communicated between the blue tooth facility 2 and the keyboard facility 3, and a plug, such as a universal serial bus (USB) plug 12 coupled to the interface switching device 11, for coupling to various kinds of computer facilities 4, and thus for coupling the keyboard assembly 1 to the computer facilities 4.

Figure 3:
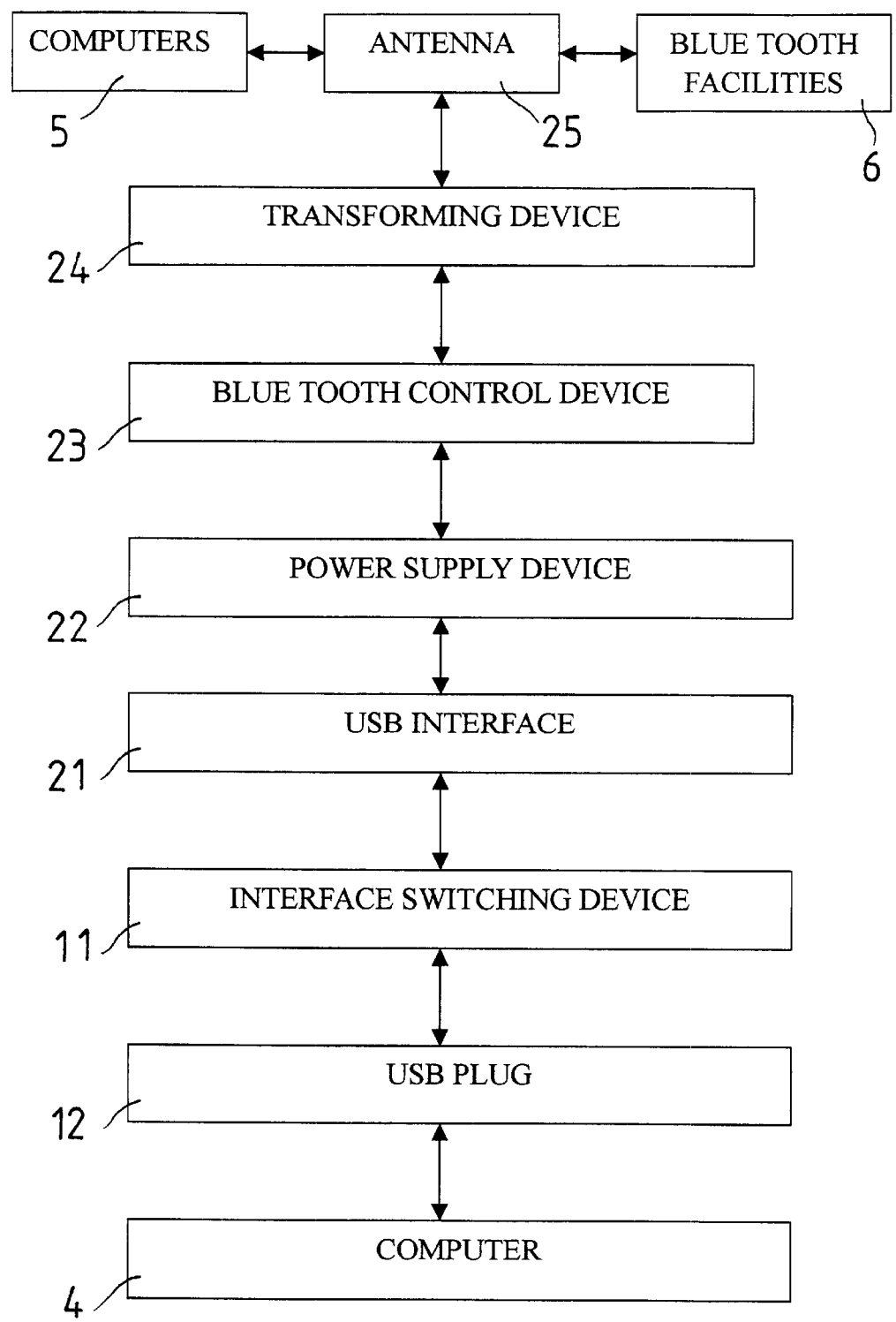
FIG. 3 is a block diagram illustrating the parts or members or elements of the wireless communicating portion or device of the keyboard assembly.

As shown in FIGS. 2 and 3, the blue tooth facility 2 includes a universal serial bus (USB) interface circuit or card or device 21 coupled to the interface switching device 11 of the interface facility 10, for communicating the blue tooth facility 2 with the interface facility 10, and includes an electric power supply device 22 coupled to the blue USB interface device 21 for obtaining electric power from such as the computer facilities 4, and in order to energize the blue tooth facility 2.

The blue tooth facility 2 further includes a blue tooth control chip or integrated circuit or blue tooth processor or control device 23 coupled to the electric power supply device 22, a signal treating or processing or converting or transforming device 24 coupled to the blue tooth control device 23, and an antenna 25 coupled to the signal converting or transforming device 24, for transmitting signals out from the computer facilities 4 or for receiving signals from the other computer facilities 5, 6.

For example, the signals from the computer facilities 4 or from the keyboard facility 3 may be converted by the signal converting or transforming device 24, into the signals that may be transmitted out via the antenna 25. On the contrary, the signals received from the other computer facilities 5, 6 via the antenna 25 may also be converted by the signal converting or transforming device 24, and then sent or transmitted to the computer facilities 4.

Figure 4:
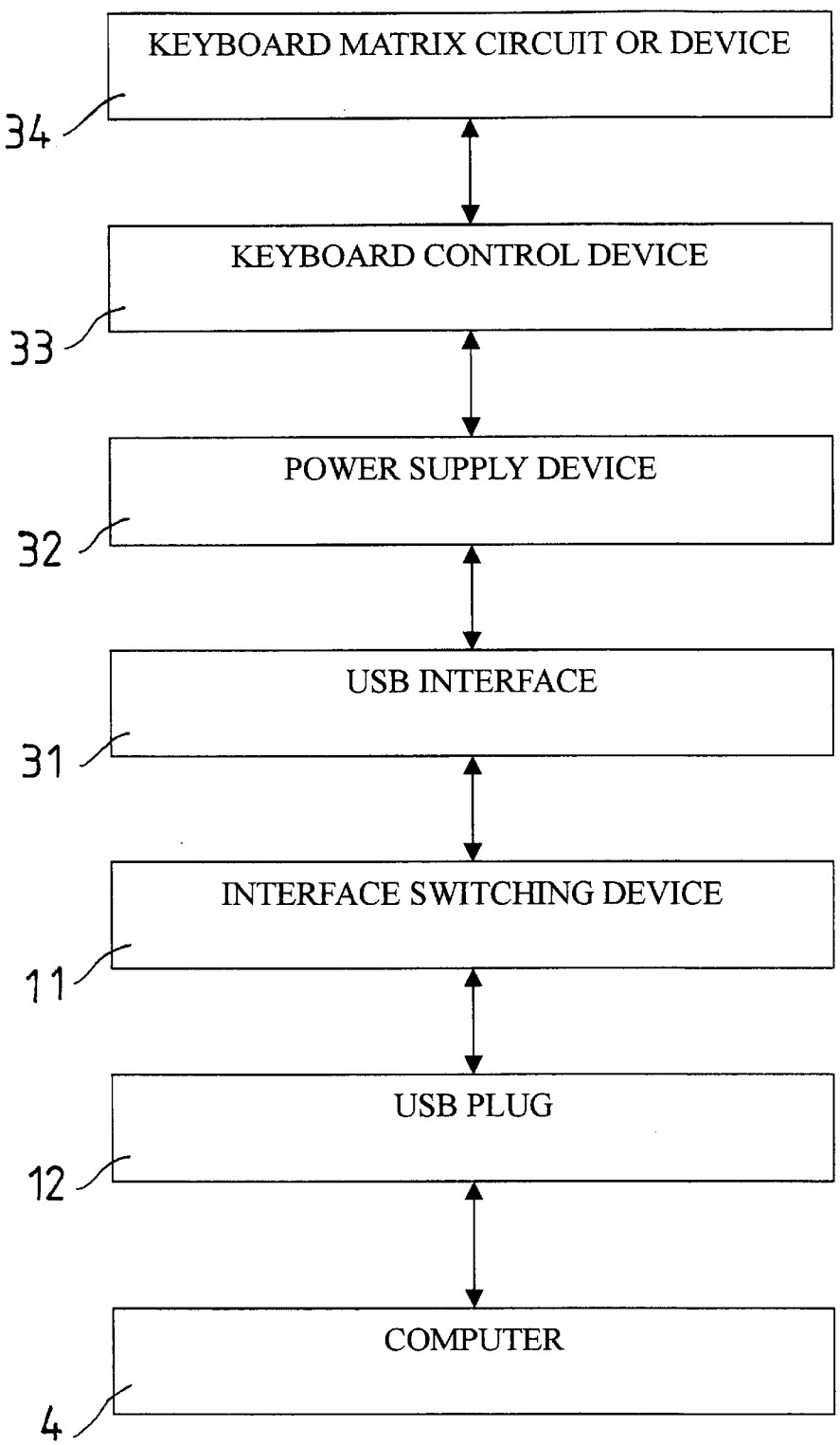
FIG. 4 is a block diagram illustrating the parts or members or elements of the keyboard assembly.

As shown in FIGS. 2 and 4, the keyboard facility 3 includes a universal serial bus (USB) interface circuit or card or device 31 coupled to the interface switching device 11 of the interface facility 10, for communicating the keyboard facility 3 with the interface facility 10, and includes an electric power supply device 32 coupled to the blue USB interface device 31 for obtaining electric power from such as the computer facilities 4, and in order to energize the keyboard facility 3.

The keyboard facility 3 further includes a keyboard control chip or integrated circuit or processor or control device 33 coupled to the electric power supply device 32, a keyboard matrix circuit or device 34 coupled to the keyboard control device 33. The keyboard matrix device 34 may be provided to detect and send the signals of the keyboard assembly 1 to the computer facilities 4 via the keyboard control device 33 and the electric power supply device 32 and the USB interface device 31, such that the keyboard facility 3 may be communicated with the interface facility 10, and then with the computer facilities 4.

The keyboard assembly 1 typically comprises a number of keys or buttons to be depressed or stricken by the users, in order to generate various control signals. The signals generated by the keyboard assembly 1 may thus be transmitted out from the interface facility 10 to the computer facilities 4 of the users, in order to control or to operate the computer facilities 4.

In operation, the users of the computer facilities 4 may use the keyboard assembly 1 to operate the computer facilities 4, and to transmit the signals from the computer facilities 4 out to the other computer facilities 5, 6, and to receive the signals from the other computer facilities 5, 6 via the antenna 25, for allowing the end users 4, 5, 6 to be communicated with each other easily.

The keyboard assembly 1 may also be energized by the electric power source supplied to the computer facilities 4, such that additional electric power sources or batteries or the like are not required to be coupled to the keyboard assembly 1.

Accordingly, the keyboard assembly may be used for communicating the computer facilities of the users to the other end users wirelessly, or for allowing various computer facilities of the users to be easily communicated with each other.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A keyboard assembly comprising:
    an interface facility including a USB plug for coupling to computer facility, and including an interface switching device coupled to said USB plug,
    a keyboard facility including an interface device coupled to said interface switching device of said interface facility, an electric power supply device coupled to interface device of said keyboard facility, to receive electric power from the computer facility, and a keyboard matrix device coupled to said electric power supply device, to detect and send signals of said keyboard assembly to the computer facility via said interface device of said keyboard facility and said interface facility, and
    a blue tooth facility including an interface device coupled to said interface switching device of said interface facility, a signal transforming device coupled to said interface device of said blue tooth facility, to transform signals to and from the computer facility, and an antenna coupled to said signal transforming device to receive and send signals from and out of the computer facility.

2. The keyboard assembly as claimed in claim 1, wherein said blue tooth facility further includes an electric power supply device coupled to said interface device of said blue tooth facility, to receive electric power from the computer facility.

3. The keyboard assembly as claimed in claim 1, wherein said blue tooth facility further includes a blue tooth control device coupled to said signal transforming device of said blue tooth facility.

4. The keyboard assembly as claimed in claim 1, wherein said keyboard facility further includes a keyboard control device coupled to said electric power supply device of said keyboard facility, to control sending of signals of said keyboard assembly to the computer facility.

5. A keyboard assembly comprising:
    an interface facility including a USB plug for coupling to computer facility, and including an interface switching device coupled to said USB plug,
    a keyboard facility including an interface device coupled to said interface switching device of said interface facility, and a keyboard matrix device coupled to said interface device, to detect and send signals of said keyboard assembly to the computer facility via said interface device of said keyboard facility and said interface facility, and
    a blue tooth facility including an interface device coupled to said interface switching device of said interface facility, an electric power supply device coupled to said interface device of said blue tooth facility, to receive electric power from the computer facility, and a signal transforming device coupled to said electric power supply device of said blue tooth facility, to transform signals to and from the computer facility, and an antenna coupled to said signal transforming device to receive and send signals from and out of the computer facility.

6. The keyboard assembly as claimed in claim 5, wherein said keyboard facility further includes an electric power supply device coupled to said interface device of said keyboard facility, to receive electric power from the computer facility.

7. The keyboard assembly as claimed in claim 5, wherein said keyboard facility further includes a keyboard control device coupled to said interface device of said keyboard facility, to control sending of said signals of said keyboard assembly to the computer facility.

8. The keyboard assembly as claimed in claim 7, wherein said blue tooth facility further includes a blue tooth control device coupled to said signal transforming device of said blue tooth facility.

* * * * *